United States Patent [19]
Ghosh et al.

[11] Patent Number: 6,065,907
[45] Date of Patent: May 23, 2000

[54] CUTTING INSERT WITH CHIP CONTROL

[75] Inventors: Ranajit Ghosh, Monroeville; Kenneth L. Niebauer, Ligonier, both of Pa.

[73] Assignee: Kennametal Inc., Latrobe, Pa.

[21] Appl. No.: 09/220,811

[22] Filed: Dec. 23, 1998

[51] Int. Cl.[7] .................................................. B23B 27/22
[52] U.S. Cl. .......................... 407/114; 407/115; 407/116
[58] Field of Search .................................... 407/114, 113, 407/115, 116

[56] References Cited

U.S. PATENT DOCUMENTS

| D. 365,112 | 12/1995 | Wiman et al. ........................... D15/139 |
| 3,947,937 | 4/1976 | Hertel ....................................... 29/95 R |
| 4,626,141 | 12/1986 | Malaker et al. ......................... 407/114 |
| 4,859,122 | 8/1989 | Patterson et al. ....................... 407/114 |
| 4,893,969 | 1/1990 | Hessman et al. .................... 407/115 X |
| 5,044,840 | 9/1991 | Fouquer et al. ..................... 407/115 X |
| 5,122,017 | 6/1992 | Niebauer ................................. 407/114 |
| 5,230,591 | 7/1993 | Katbi et al. ......................... 407/116 X |
| 5,282,703 | 2/1994 | Itaba et al. .............................. 407/114 |
| 5,476,346 | 12/1995 | Lundström ............................. 407/114 |
| 5,577,867 | 11/1996 | Paya ....................................... 407/114 |
| 5,743,681 | 4/1998 | Wiman et al. .......................... 407/114 |

*Primary Examiner*—Henry W. H. Tsai
*Attorney, Agent, or Firm*—John J. Prizzi

[57] ABSTRACT

An indexable cutting insert is disclosed capable of cutting operations over a wide range of depth of cuts. The insert has different geometries at different locations on the cutting surface such that, under differing cutting parameters, a desirable cutting surface will be in contact with the workpiece.

22 Claims, 3 Drawing Sheets

CUTTING INSERT WITH CHIP CONTROL

FIELD OF THE INVENTION

The invention is directed to cutting tools and, in particular, to an indexable cutting insert having a geometry which provides chip control over a range of feed rates.

BACKGROUND OF THE INVENTION

With the current selection of cutting insert geometries, it is necessary, when the feed rate is significantly altered, to change the cutting insert to one having the desired geometry most effective for that feed rate. This process not only requires changing cutting inserts to satisfy the cutting parameters, but also necessitates maintaining an inventory of various cutting inserts such that the desired insert geometry is available when needed.

U.S. Pat. No. 5,230,591 to Katbi et al. teaches a cutting insert having a central plateau with walls diverging from the insert cutting edge as the plateau extends away from a corner. A chip deceleration pad has associated with it a wall which is generally parallel along the cutting edge. While this arrangement may provide chip control during machining in which the workpiece engages only the corner region of the insert, many machining operations involve a feed rate which engage the insert beyond the corner region. Under these circumstances, the chip deceleration pad which is essentially parallel to the cutting edge provides limited chip control.

It is therefore an object of this invention to provide a cutting insert that may effectively be utilized over a wide range of feed rates and, through this versatility, reduce the frequency of changing inserts and reduce the need for a large variety of different insert geometries.

SUMMARY OF THE INVENTION

The subject invention is directed to an indexable cutting insert having a polygonal body of wear resistant material. The body includes a top surface, a bottom surface and a peripheral wall therebetween. The peripheral wall has sides and corners and the intersection of the peripheral wall and the top surface forms a cutting edge with a land extending therein from the cutting edge. The top surface comprises a floor, a sloping wall inclined downwardly and inwardly from the land to the floor, a plateau disposed upon the floor and spaced inwardly from the sloping wall. The plateau has sloped sides ascending from the floor and a rail which begins at a corner protruding from the floor. The rail is positioned between the cutting edge and the plateau ad extends away from the corner generally along a rail axis. The rail axis diverges from a line parallel to the cutting edge as it extends from the corner.

In a second embodiment of the invention, a plateau side axis extends through the plateau sloping sides and the plateau side axis diverges from the rail axis as it extends from the corner.

BRIEF DESCRIPTION OF THE DRAWINGS

The above, as well as other features and advantages of the invention will become apparent with the detailed description in connection with the several drawings in which.

DESCRIPTION OF THE PREFERRED EMBODIMENT

Figure 1:
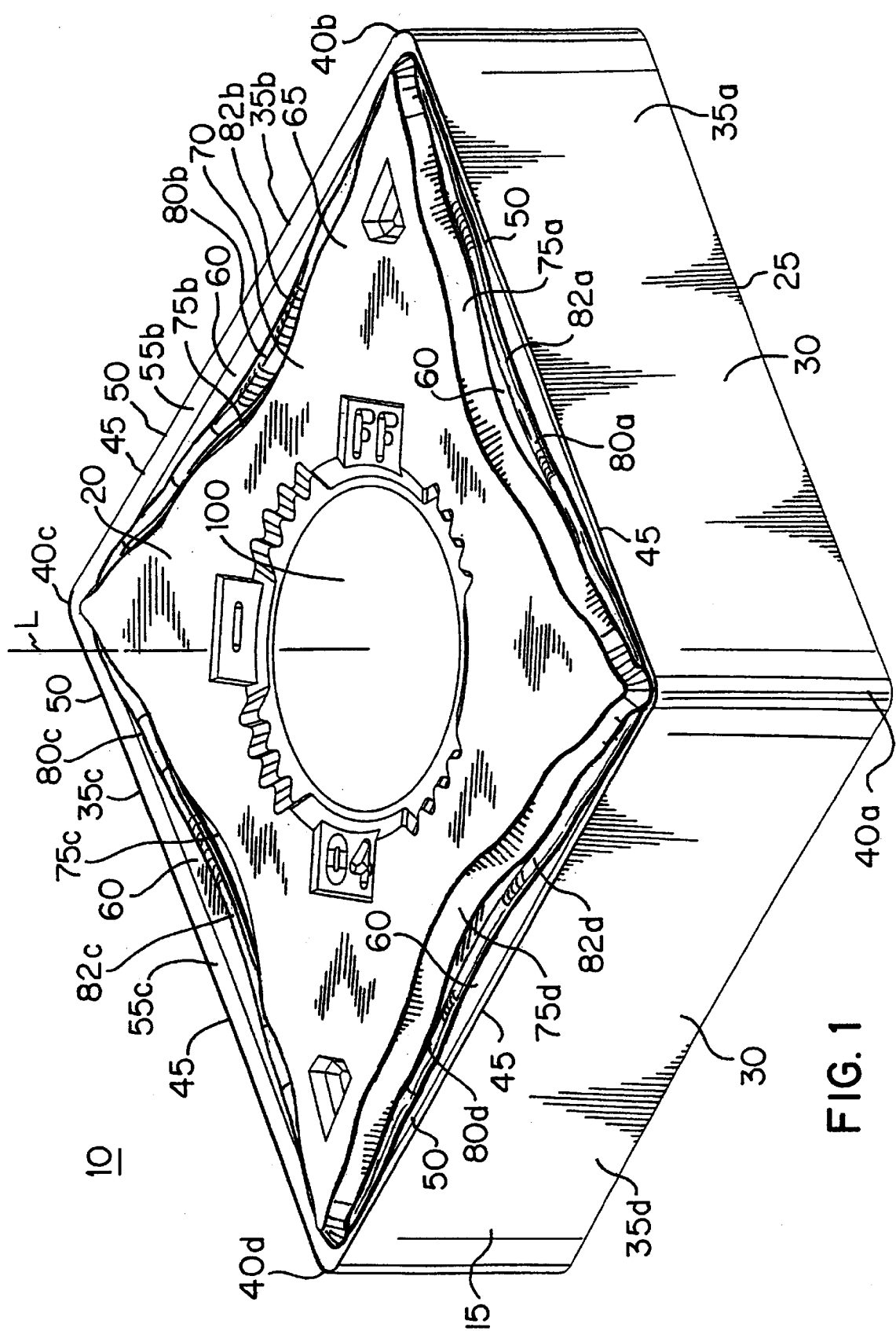
FIG. 1 is a perspective view of the cutting insert in accordance with the present invention.

FIG. 1 shows a perspective view of a polygonal indexable cutting insert 10. The insert 10 has a polygonal body 15 of wear-resistant material. The body 15 includes top surface 20 and a bottom surface 25 and therebetween a peripheral wall 30 having sides 35a, b, c, d and corners 40a, b, c, d. A cutting edge 45 is formed at the intersection of the top surface 20 and the peripheral wall 30.

For purposes of this discussion, the cutting insert features associated with side 35a and corner 40a will be discussed with the understanding that such a discussion may be applied equally to the cutting insert features associated with the remaining sides 35b, c, d and the remaining corners 40b, c, d.

Figure 2:
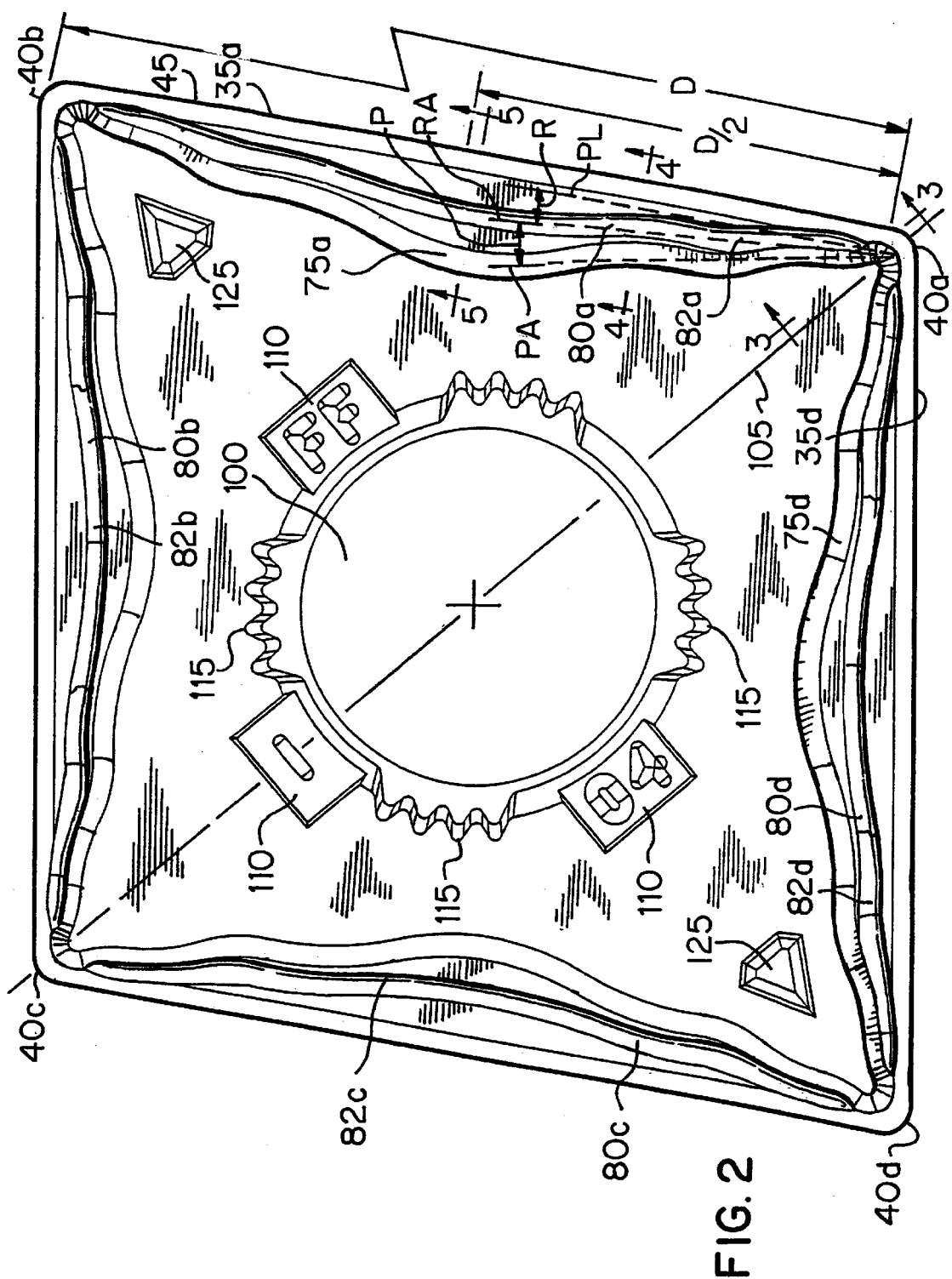
FIG. 2 is a top view of the cutting insert shown in FIG. 1.

Furthermore, for the purpose of this discussion, as illustrated in FIG. 1 and FIG. 2, an insert geometry identified as an 80° diamond, which is a rhombic configuration having two 80° corners and two 100° corners, will be presented. However, it should be realized that the configuration of this invention should not be limited to an 80° diamond and that other geometric shapes may be substituted. Among the shapes may be other rhombic configurations such as squares, a 55° diamond (which has two 55° corners and two 125° corners), a triangle, or a trigon. The cutting insert may be manufactured of any wear-resistant material used for cutting inserts, and this material is generally know to those skilled in the art of fabricating such cutting inserts.

Returning to FIG. 1 and FIG. 2, a cutting edge land 50 extends inwardly from the cutting edge 45 toward the center indicated by longitudinal axis L of the body 15. The land 50 is comprised of a band extending around the perimeter of the body 15 along the cutting edge 45. A sloping wall 55a, b, c, d extends from the land 50 downwardly and inwardly to a floor 60. The floor 60 is disposed at a lower elevation than the land 50.

A plateau 65 is disposed upon the floor 60. The plateau 65 is spaced from each sloping wall 55a, b, c, d. The plateau 65 has a top surface 70 generally having a star shape. The plateau 65 has sloped sides 75a, b, c, d which ascend from the floor 60.

Rails 80a, b, c, d protrude from the floor 60 beginning at and extending away from each corner 40a, b, c, d generally along a rail axis RA (FIG. 2). Each rail 80a, b, c, d has a rail side 82a, b, c, d, respectively, and is positioned between the cutting edge 45 and the plateau 65. The rail axis RA of each rail 80a, b, c, d diverges from a line PL parallel to the cutting edge 45 as it extends away from each corner 40a, b, c, d.

The cutting edge 45 along a side 35a of the insert body 15 defines a length D and the rail axis RA diverges from the cutting edge 45 up to a distance of ½ the length D, or D/2 as designated in FIG. 2, of the side 35a. As can be more clearly seen in FIG. 2, the rail axis RA extending from corner 40a diverges from a line PL parallel to the cutting edge but only to the midpoint designated by D/2.

While it is possible to implement a feed rate during a machining operation that would engage the cutting edge 45 to a distance designated by D/2 on the cutting edge 45, such engagement is unlikely and therefore, the design of the present application should not be limited to a continuous rail 80a but such a design should allow for a discontinuity in the rail 80a in the region of the midpoint.

Although the rail 80a follows the rail axis RA, the rail 80a may have an undulating pattern, as illustrated in FIGS. 1 and 2. In the alternative, the rail 80*a* may be comprised of a straight pattern having rail sides 82*a* which are parallel to the rail axis RA along the entire length of the rail 80*a* in a straight pattern. However, in both cases, the rail 80*a* follows the rail axis RA which diverges from the line PL parallel to the cutting edge 45.

As illustrated in FIGS. 1 and 2, the plateau sloped side 75*a* follows a plateau side axis PA. The plateau axis PA may diverge from the rail axis RA as the plateau side axis PA extends from the corner 30*a*. Furthermore, the plateau side 75*a* may follow the plateau side axis PA in an undulating pattern as illustrated in FIGS. 1 and 2. In the alternative, the plateau side 75*a* may be straight and parallel to the plateau side axis PA in a straight pattern.

As illustrated in FIG. 2, a rail angle R is formed between the rail axis RA and the cutting edge 45. The value of rail angle R may be between 5° and 30° and a preferred angle is between 10° and 20°. Additionally, a plateau side angle P is formed between the plateau side axis PA and the rail axis RA. The plateau side angle may have a value between 5° and 30°, however, a preferred angle is between 10° and 20°. The rail angle R and the plateau side angle P may be equal or, to provide more exaggerated chip control, may be unequal such that one axis diverges at a greater rate than the other axis.

Figure 3:
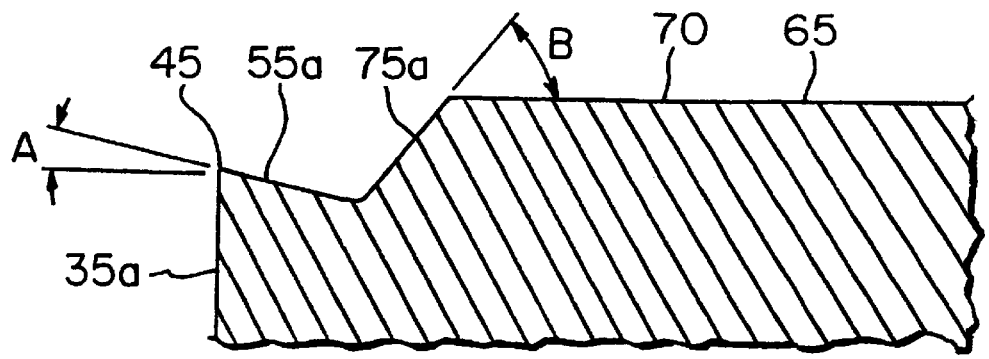
FIG. 3 is a section view along arrows "3—3" in FIG. 2.

As illustrated in FIG. 3, which is a section view indicated by arrows "3—3" in FIG. 2, the plateau top surface 70 may be planar and the sloping wall 55*a* forms an angle A with a line parallel to the top surface 70 of the plateau 65. The value of angle A may be between 15° and 25°.

Figure 4:
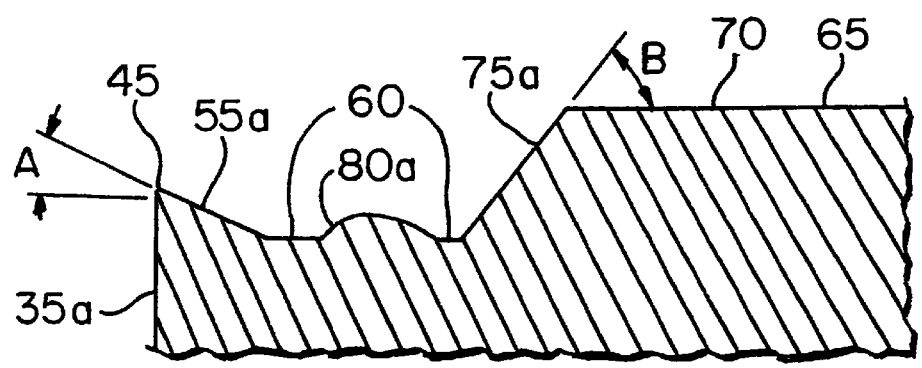
FIG. 4 is a section view along arrows "4—4" in FIG. 2.
Figure 5:
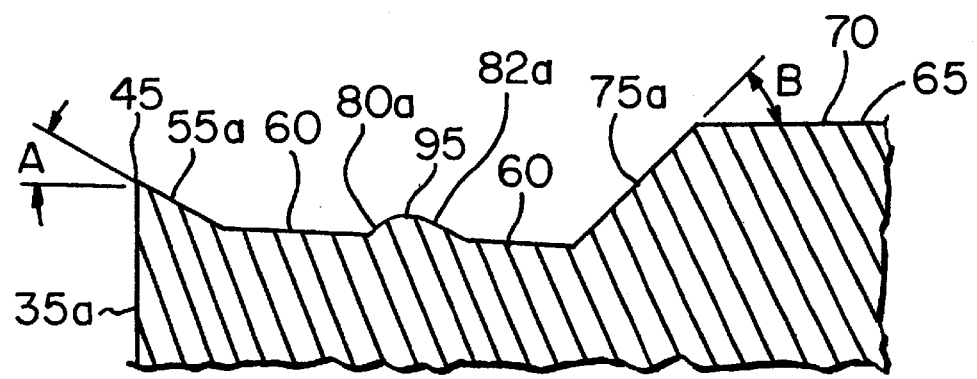
FIG. 5 is a section view along lines "5—5" in FIG. 2.

As illustrated in FIGS. 4 and 5, as the distance from the corner 40*a* increases the angle A of the sloping wall 55*a* may increase. As an example, in the corner region of FIG. 3, the value of the angle A may be 15° while further away from the corner region (FIGS. 4 and 5) the value of angle A may be approximately 25°. This feature provides for more aggressive chip control associated with a greater chip thickness for chips formed further from the corner 40*a* of the insert 10.

As illustrated in FIG. 5, the top surface 70 of the plateau 65 is at a higher elevation than the top 95 of the rail 80.

The plateau side 75*a* forms an angle B with a line parallel to the top surface 70 of the plateau 65 of between 25° and 60° and with a preferred angle of about 40°. While not illustrated in FIGS. 3–5, the land 50 may extend from the cutting edge 45 at a different angle than that of the sloping wall 55*a* and typically at a smaller angle relative to the line parallel to the top surface 70.

FIG. 5 illustrates, among other things, the relative position of the rail 80*a* to the cutting edge 45 and the plateau 65.

While only the portion of the body 15 associated with side 35*a* has been discussed so far, it should be appreciated the features of the body 15 are symmetric about a bisector line 105 which extends through the longitudinal axis L from corner 40*a* to corner 40*c*. As an example, a rail 80*a* and plateau side 75*a* are positioned on one side 35*a* of the corner 40*a* while another rail 80*d* and plateau side 75*d* are associated with side 35*d* whereby this pair of rails 80*a*, 80*d* and plateau 65 is symmetric about the bisector line 105.

A circular opening 100 extending from the top surface 20 through the bottom surface 25 of the body 15 may be provided in order to permit securing the cutting insert 10 to a toolholder for use in machining operations. However, there are different mechanisms for securing a cutting insert within a toolholder. For that reason, other techniques may be utilized whereby the circular opening is unnecessary.

The indicia 110 and the generally triangle clusters 115 positioned about the perimeter 120 of the circular opening 100 are not germane to the subject invention. Furthermore, the generally diamond shaped cavities 125 in the general region of corners 40*b*, *d* are also not germane to the subject invention.

The present invention and many of its intended advantages will be understood from the foregoing description and it will be apparent that various changes may be made in the form, construction and arrangement of the parts thereof without departing from the spirit and the scope of the invention or sacrificing all of its material advantages, the form herein described being merely preferred or exemplary embodiments thereof.

What is claimed:

1. An indexable cutting insert comprising a polygonal body of wear resistant material wherein the body includes a top surface, a bottom surface and a peripheral wall therebetween having sides and corners and wherein the intersection of the peripheral wall and the top surface forms a cutting edge with a land extending therein from the cutting edge, the top surface comprising:

a) a floor;

b) a sloping wall inclined downwardly and inwardly from the land to the floor;

c) a plateau disposed upon the floor and spaced inwardly from the sloping wall, wherein the plateau has sloped sides ascending from the floor; and d) a rail
        i) beginning at a corner;
        ii) protruding from the floor;
        iii) positioned between the cutting edge and the plateau;
        iv) extending away from the corner generally along a rail axis;
        v) wherein the rail axis diverges from a line parallel to the cutting edge as it extends from the corner; and e) wherein the cutting edge along a side of the insert defines a length and the rail extends continuously along the rail axis a distance of at least one-fourth the length of the side.

2. The cutting insert according to claim 1 wherein the rail follows the rail axis in an undulating pattern.

3. The cutting insert according to claim 1 wherein the rail has sides which are parallel to the rail axis and follow the rail axis in a straight pattern.

4. The cutting insert according to claim 1 wherein the plateau sides follow the plateau side axis in an undulating pattern.

5. The cutting insert according to claim 1 wherein the plateau sides are parallel to the plateau side axis and follow the plateau side axis in a straight pattern.

6. The cutting insert according to claim 1 wherein a rail angle R is formed between the rail axis and the cutting edge and has a value between 5–30 degrees.

7. The cutting insert according to claim 1 wherein a plateau side angle P is formed between the plateau side axis and the rail axis and has a value between 5–30 degrees.

8. The cutting insert according to claim 1 wherein a rail angle R is formed between the rail axis and the cutting edge, a plateau side angle P is formed between the plateau side axis and the rail axis and wherein each have an angle of between 10–20 degrees.

9. The cutting insert according to claim 1 wherein the top of the plateau is planar and the sloping wall of the insert forms an angle A with a line parallel to the top of the plateau of between 15–25 degrees.

10. The cutting insert according to claim 9 wherein the angle A increases as the distance from the corner increases.

11. The cutting insert according to claim 1 wherein the plateau sloped side forms an angle B with a line parallel to the top of the plateau of between 25–60 degrees.

12. The cutting insert according to claim 11 wherein the angle B is about 40 degrees.

13. The cutting insert according to claim 1 wherein a rail and a plateau side are positioned on both sides of a corner and the plateau and rail are symmetric about a bisector line bisecting an angle defined by the intersection of two adjacent sides of a corner.

14. An indexable cutting insert comprising a polygonal body of wear resistant material wherein the body includes a top surface, a bottom surface and a peripheral wall therebetween having sides and corners and wherein, the intersection of the peripheral wall and the top surface forming a cutting edge with a land extending therein from the cutting edge, the top surface comprising:

a) a floor;

b) a sloping wall inclined downwardly and inwardly from the land to the floor;

c) a plateau disposed upon the floor and spaced inwardly from the sloping wall, wherein the plateau has sloped sides ascending from the floor;

d) a rail
  i) beginning at a corner;
  ii) protruding from the floor;
  iii) positioned between the cutting edge and the plateau;
  iv) extending away from the corner generally along a rail axis;
  v) wherein the rail axis diverges from a line parallel to the cutting edge as it extends from the corner;

e) wherein a plateau side axis extends through the sloped sides and the plateau side axis diverges from the rail axis as it extends from the corner; and f) wherein the cutting edge along a side of the insert defines a length and the plateau sloped sides follow the side axis continuously a distance of at least one-fourth the length of the side.

15. The cutting insert according to claim 14 wherein the cutting edge along a side of the insert defines a length and the rail axis diverges from the cutting edge up to a distance of one-half the length of the side.

16. The cutting insert according to claim 14 wherein the rail follows the rail axis in an undulating pattern.

17. The cutting insert according to claim 14 wherein the plateau sides follow the plateau side axis in an undulating pattern.

18. The cutting insert according to claim 14 wherein a rail angle R is formed between the rail axis and the cutting edge and has a value between 5–30 degrees.

19. The cutting insert according to claim 14 wherein a plateau side angle P is formed between the plateau side axis and the rail axis and has a value between 5–30 degrees.

20. The cutting insert according to claim 14 wherein a rail angle R is formed between the rail axis and the cutting edge, a plateau side angle P is formed between the plateau side axis and the rail axis and wherein each have a preferred angle of between 10–20 degrees.

21. The cutting insert according to claim 14 wherein the plateau side of the insert forms an angle B with a line parallel to the top of the plateau of between 25–60 degrees.

22. The cutting insert according to claim 14 wherein a rail and a plateau side are positioned on both sides of a corner and wherein the plateau and rail are symmetric about a bisector line bisecting an angle defined by the intersection of two cutting edges extending from two adjacent sides of a corner.

* * * * *